US012608297B2

(12) United States Patent
Yang et al.

(10) Patent No.: US 12,608,297 B2
(45) Date of Patent: Apr. 21, 2026

(54) SYNCHRONIZING FULL LINK TRACING INFORMATION IN A MICROSERVICES ENVIRONMENT

(71) Applicant: INTERNATIONAL BUSINESS MACHINES CORPORATION, Armonk, NY (US)

(72) Inventors: Jin Jin Yang, Beijing (CN); Chun Li Jia, Beijing (CN); Xiao Ling Chen, Beijing (CN); Qian Xia Song, Beijing (CN); Ai Ping Feng, Beijing (CN); Kui Zhang, Tianjin (CN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 18/128,395

(22) Filed: Mar. 30, 2023

(65) Prior Publication Data

US 2024/0330152 A1    Oct. 3, 2024

(51) Int. Cl.
*G06F 11/362* (2025.01)
*G06F 11/32* (2006.01)
*G06F 11/34* (2006.01)

(52) U.S. Cl.
CPC ........ *G06F 11/3636* (2013.01); *G06F 11/323* (2013.01); *G06F 11/3466* (2013.01)

(58) Field of Classification Search
USPC .......................................... 717/124
See application file for complete search history.

(56) References Cited

U.S. PATENT DOCUMENTS 9,407,649 B2    8/2016  Honda et al.
10,831,649 B2    11/2020  Gadiya et al.
10,951,491 B2    3/2021  Brown et al.
(Continued)

FOREIGN PATENT DOCUMENTS

WO    2022086610    4/2022

OTHER PUBLICATIONS

Cinque, Marcello, Raffaele Della Corte, and Antonio Pecchia. "Microservices monitoring with event logs and black box execution tracing." IEEE transactions on services computing 15.1 (2019): 294-307. (Year: 2019).*

(Continued)

*Primary Examiner* — Matthew J Brophy
(74) *Attorney, Agent, or Firm* — Seed Intellectual Property Law Group LLP

(57) ABSTRACT

A method, system, and computer program product are configured to: create a link tracing data structure in response to receiving a request from a user interface (UI), wherein the link tracing data structure includes a synchronization identifier and information about user actions in the UI; handle the request by calling plural microservices; add respective synchronization content for each one of the plural microservices to the link tracing data structure, wherein the respective synchronization content for a respective one of the plural microservices comprises: the synchronization identifier; a respective step identifier that identifies the respective one of the plural microservices; and a respective synchronization message that describes an execution status of the respective one of the plural microservices; store the link tracing data structure; and provide the link tracing data structure to a requesting user.

20 Claims, 5 Drawing Sheets create a link tracing data structure in response to receiving a request from a user interface (UI) — 405 handle the request by calling plural microservices — 410 add respective synchronization content for each one of the plural microservices to the link tracing data structure — 415 store the link tracing data structure — 420 provide the link tracing data structure to a requesting user — 425

(56) References Cited

U.S. PATENT DOCUMENTS

| | | | | |
|---|---|---|---|---|
| 11,030,068 B1 * | 6/2021 | Agarwal | | G06F 11/327 |
| 11,093,232 B2 * | 8/2021 | Maréchal | | G06F 8/65 |
| 11,108,857 B2 * | 8/2021 | Brasetvik | | H04L 67/1097 |
| 11,157,513 B2 * | 10/2021 | Xu | | G06F 16/24568 |
| 11,240,126 B2 * | 2/2022 | Makwarth | | H04L 41/5009 |
| 11,323,418 B2 * | 5/2022 | Barton | | H04L 41/5051 |
| 11,347,622 B1 * | 5/2022 | Agarwal | | G06F 11/323 |
| 11,347,625 B1 | 5/2022 | Agarwal et al. | | |
| 11,416,374 B1 * | 8/2022 | Wu | | G06F 11/3636 |
| 11,526,413 B2 * | 12/2022 | Barnsteiner | | H04L 43/10 |
| 11,789,804 B1 * | 10/2023 | Danyi | | G06F 11/323 |
| | | | | 714/38.1 |
| 11,868,235 B2 * | 1/2024 | Ranka | | G06F 11/3006 |
| 12,099,428 B1 * | 9/2024 | Agarwal | | G06F 16/24556 |
| 2018/0203795 A1 * | 7/2018 | Gadiya | | G06F 11/3612 |
| 2019/0268408 A1 * | 8/2019 | Brasetvik | | H04L 9/3213 |
| 2020/0021505 A1 * | 1/2020 | Vinnakota | | H04L 45/20 |
| 2020/0073785 A1 * | 3/2020 | Alaranta | | G06F 11/3636 |
| 2020/0328952 A1 * | 10/2020 | Makwarth | | H04L 41/5051 |
| 2021/0232485 A1 * | 7/2021 | Agarwal | | G06F 11/3624 |
| 2022/0171689 A1 * | 6/2022 | Barnsteiner | | H04L 41/5009 |
| 2022/0172067 A1 | 6/2022 | Kang et al. | | |
| 2023/0254330 A1 * | 8/2023 | Singh | | G06F 11/323 |
| | | | | 726/23 |

OTHER PUBLICATIONS

Yu, Guangba, et al. "Nezha: Interpretable fine-grained root causes analysis for microservices on multi-modal observability data." Proceedings of the 31st ACM Joint European Software Engineering Conference and Symposium on the Foundations of Software Engineering. 2023. (Year: 2023).*

Anonymous, "A Method to Enhance Root Cause Discovery", IP.com No. IPCOM000264244D, Nov. 25, 2020, 10 pages.

* cited by examiner

100

COMPUTER 101

PROCESSOR SET 110

| PROCESSING CIRCUITRY 120 | CACHE 121 |

COMMUNICATION FABRIC 111

VOLATILE MEMORY 112

PERSISTENT STORAGE 113

OPERATING SYSTEM 122

LINK TRACING CODE

200

PERIPHERAL DEVICE SET 114

| UI DEVICE SET 123 | STORAGE 124 | IoT SENSOR SET 125 |

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

| CLOUD ORCHESTRATION MODULE 141 | HOST PHYSICAL MACHINE SET 142 |
| VIRTUAL MACHINE SET 143 | CONTAINER SET 144 |

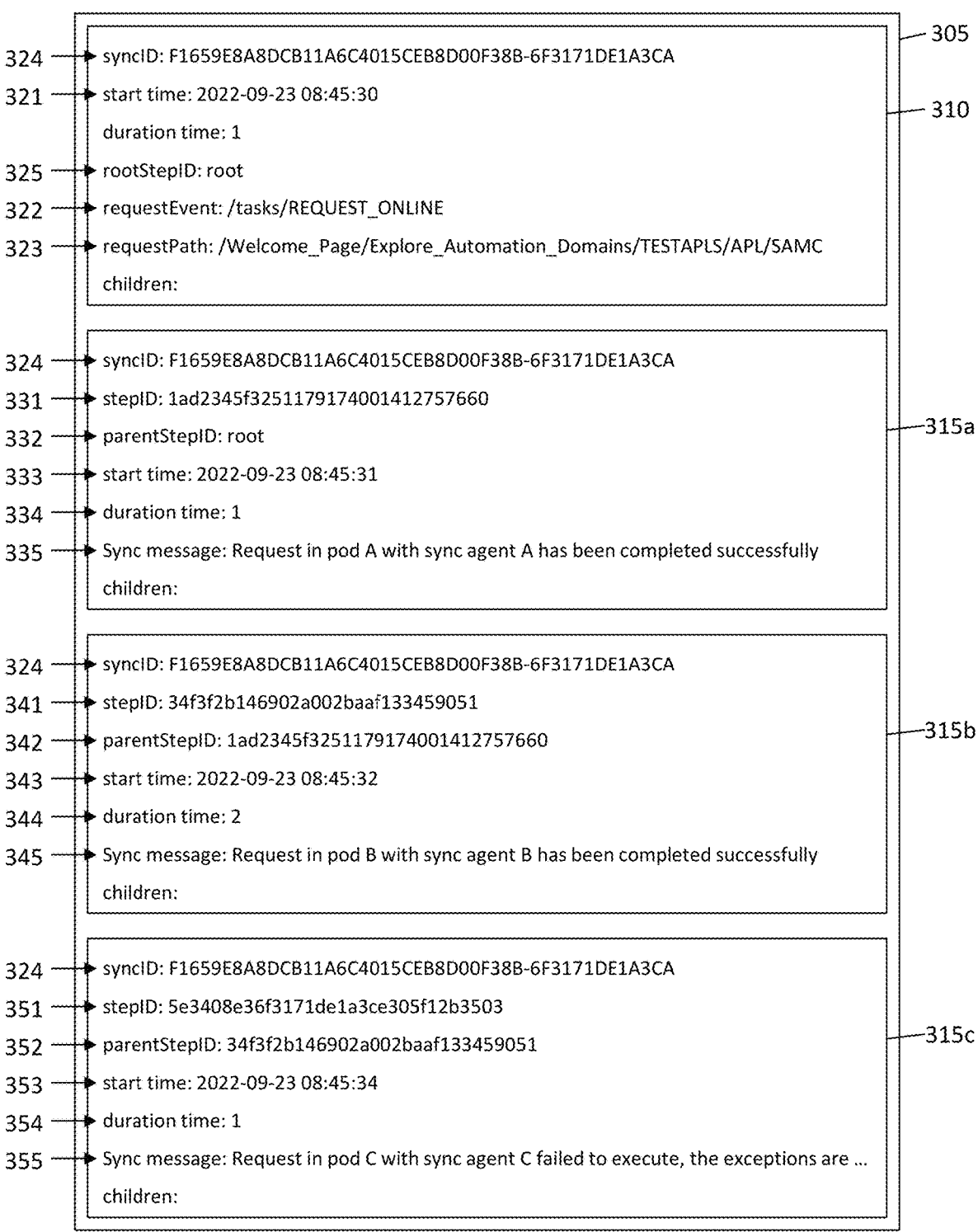

324 → syncID: F1659E8A8DCB11A6C4015CEB8D00F38B-6F3171DE1A3CA

321 → start time: 2022-09-23 08:45:30 duration time: 1

325 → rootStepID: root

322 → requestEvent: /tasks/REQUEST_ONLINE

323 → requestPath: /Welcome_Page/Explore_Automation_Domains/TESTAPLS/APL/SAMC children:

— 305

— 310

324 → syncID: F1659E8A8DCB11A6C4015CEB8D00F38B-6F3171DE1A3CA

331 → stepID: 1ad2345f3251179174001412757660

332 → parentStepID: root

333 → start time: 2022-09-23 08:45:31

334 → duration time: 1

335 → Sync message: Request in pod A with sync agent A has been completed successfully children:

— 315a

324 → syncID: F1659E8A8DCB11A6C4015CEB8D00F38B-6F3171DE1A3CA

341 → stepID: 34f3f2b146902a002baaf133459051

342 → parentStepID: 1ad2345f3251179174001412757660

343 → start time: 2022-09-23 08:45:32

344 → duration time: 2

345 → Sync message: Request in pod B with sync agent B has been completed successfully children:

— 315b

324 → syncID: F1659E8A8DCB11A6C4015CEB8D00F38B-6F3171DE1A3CA

351 → stepID: 5e3408e36f3171de1a3ce305f12b3503

352 → parentStepID: 34f3f2b146902a002baaf133459051

353 → start time: 2022-09-23 08:45:34

354 → duration time: 1

355 → Sync message: Request in pod C with sync agent C failed to execute, the exceptions are ...

children:

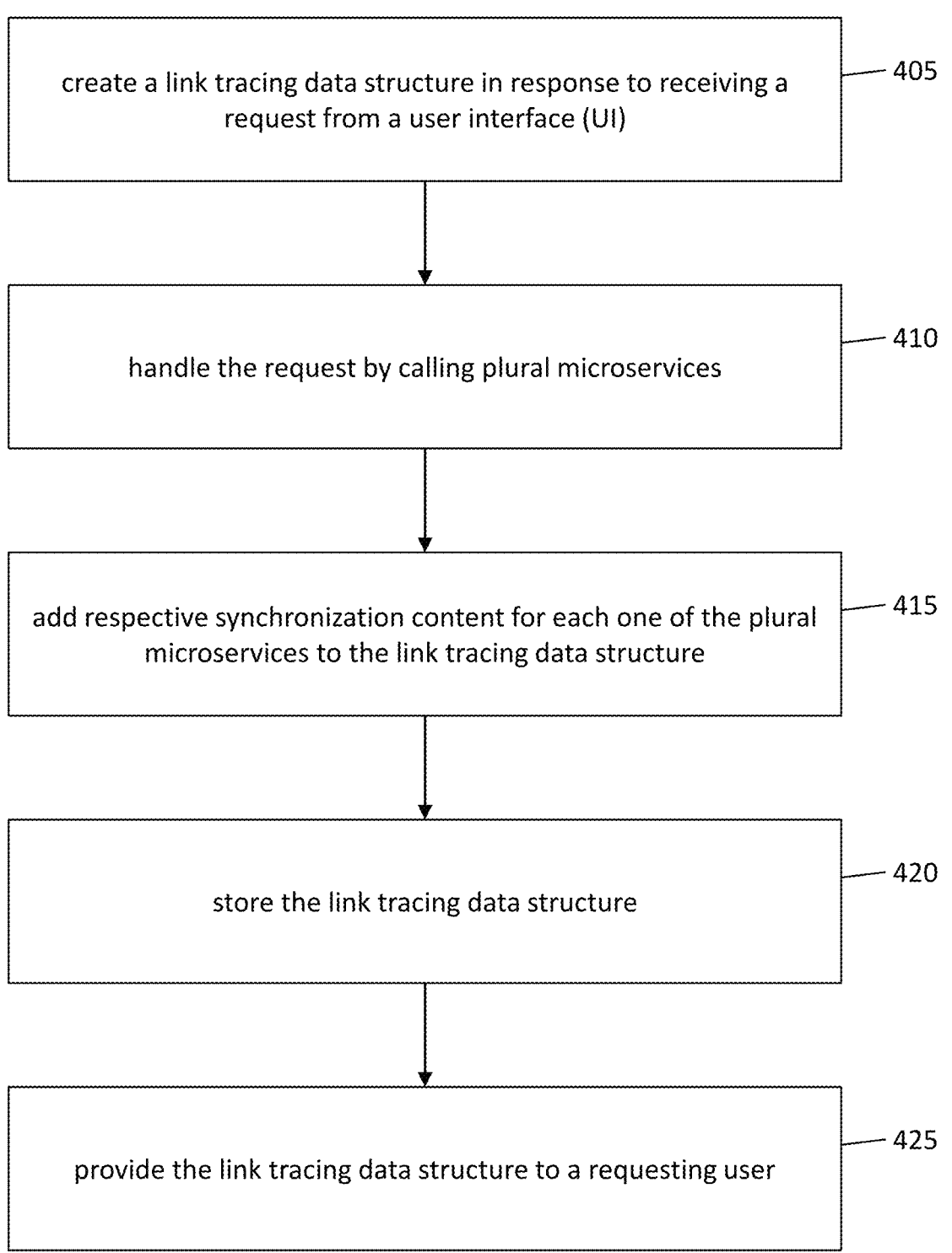

create a link tracing data structure in response to receiving a request from a user interface (UI) ——— 405 handle the request by calling plural microservices ——— 410 add respective synchronization content for each one of the plural microservices to the link tracing data structure ——— 415 store the link tracing data structure ——— 420 provide the link tracing data structure to a requesting user ——— 425

```
const body = {
    ......
    parameters: {
        UTC_OFFSET: +0200
        APL_NAME: "TESTAPLS/APL/SAMC"                    ←— 510
        COMMENT: "Start Request Testing"
        REQUEST_ID: "1F1352F2-7326-1F1A-3F4C-F2590E2A2891"
        START_TIME: "2022-09-23 08:45:30"
        REQUEST_PATH: "/Welcome_Page/Explore_Automation_Domains/TESTAPLS/APL/SAMC
        REQUEST_EVENT: "/tasks/REQUEST_ONLINE"
        ......
    }
}
```

SYNCHRONIZING FULL LINK TRACING INFORMATION IN A MICROSERVICES ENVIRONMENT

BACKGROUND

Aspects of the present invention relate generally to information technology (IT) operations management and, more particularly, to synchronizing full link tracing information for diagnosing problems in a microservices environment.

Distributed systems such as applications on the cloud often exhibit anomalous behavior such as outages or incidents. Investigating anomalous behavior, e.g., by detecting and analyzing the anomalous behavior, is a common practice in IT operations management for the purpose of improving system performance. Traces, metrics, and logs are sources of information that are commonly used to investigate anomalous behavior.

SUMMARY

In a first aspect of the invention, there is a computer-implemented method including: creating, by a processor set, a link tracing data structure in response to receiving a request from a user interface (UI), wherein the link tracing data structure includes a synchronization identifier and information about user actions in the UI; handling, by the processor set, the request by calling plural microservices; adding, by the processor set, respective synchronization content for each one of the plural microservices to the link tracing data structure, wherein the respective synchronization content for a respective one of the plural microservices comprises: the synchronization identifier; a respective step identifier that identifies the respective one of the plural microservices; and a respective synchronization message that describes an execution status of the respective one of the plural microservices; storing, by the processor set, the link tracing data structure; and providing, by the processor set, the link tracing data structure to a requesting user.

In another aspect of the invention, there is a computer program product including one or more computer readable storage media having program instructions collectively stored on the one or more computer readable storage media. The program instructions are executable to: create a link tracing data structure in response to receiving a request from a user interface (UI), wherein the link tracing data structure includes a synchronization identifier and information about user actions in the UI; handle the request by calling plural microservices; add respective synchronization content for each one of the plural microservices to the link tracing data structure, wherein the respective synchronization content for a respective one of the plural microservices comprises: the synchronization identifier; a respective step identifier that identifies the respective one of the plural microservices; and a respective synchronization message that describes an execution status of the respective one of the plural microservices; store the link tracing data structure; and provide the link tracing data structure to a requesting user.

In another aspect of the invention, there is a system including a processor set, one or more computer readable storage media, and program instructions collectively stored on the one or more computer readable storage media. The program instructions are executable to: create a link tracing data structure in response to receiving a request from a user interface (UI), wherein the link tracing data structure includes a synchronization identifier and information about user actions in the UI; handle the request by calling plural microservices; add respective synchronization content for each one of the plural microservices to the link tracing data structure, wherein the respective synchronization content for a respective one of the plural microservices comprises: the synchronization identifier; a respective step identifier that identifies the respective one of the plural microservices; and a respective synchronization message that describes an execution status of the respective one of the plural microservices; store the link tracing data structure; and provide the link tracing data structure to a requesting user.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 1 depicts a computing environment according to an embodiment of the present invention.

FIG. 3 shows an example of a link tracing data structure in accordance with aspects of the present invention.

FIG. 4 shows a flowchart of an exemplary method in accordance with aspects of the present invention.

DETAILED DESCRIPTION

Figure 2:
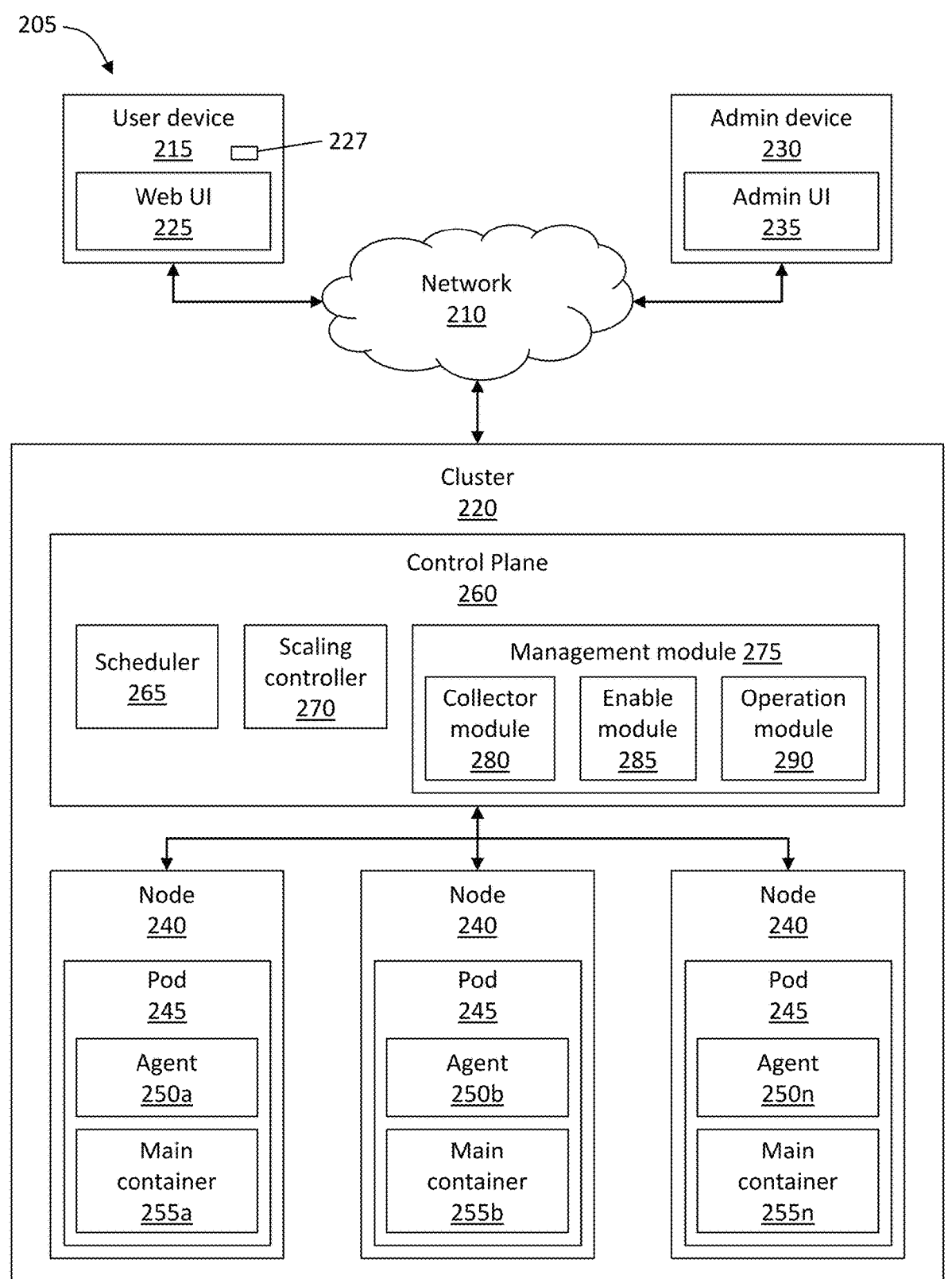
FIG. 2 shows a block diagram of an exemplary environment in accordance with aspects of the present invention.

Aspects of the present invention relate generally to information technology (IT) operations management and, more particularly, to synchronizing full link tracing information for diagnosing problems in a microservices environment. Implementations of the invention automatically create a new data structure that defines a relationship between a user interface (UI) that requests a service of an application and backend microservices that process the request. In embodiments, the new data structure identifies a chain of the microservices that are invoked in handling the request and identifies which ones of the microservices executed successfully and which one of the microservices failed to execute successfully. The new data structure is displayable in human-readable form and permits a system administrator to quickly identify where a problem occurred in the chain of microservices called in handling the request, which reduces or eliminates the time the system administrator would otherwise spend manually analyzing various logs of plural systems trying to identify where the problem occurred. The new data structure thus provides an improvement in the technical field of IT operations management by reducing the amount of time involved in diagnosing a problem with an application in a microservices environment.

Companies are trending toward more utilization of web UIs to allow users to obtain services from applications hosted in the cloud. For example, companies commonly utilize UIs to display large-scale server information in a hybrid cloud and to monitor the running status of services in the cloud. However, when a problem occurs with an application in such an environment, the UI is not used to investigate the problem, discover the root cause of the problem, or improve the efficiency of problem handling and resolution. Instead, system administrators spend large amounts of time attempting to reproduce the problem and interacting with the customer that experienced the problem.

Attempting to reproduce the problem typically involves analyzing logs to identify a location in the system where the problem occurred. Information Technology (IT) logs are generated by software systems during the execution of a program in production environments for problem detection and diagnosis in IT operations management. Logs contain information about errors, exceptions, warnings, informational events, and other diagnostic information. Logs are semi-structured machine-generated data. They can come in many formats, structures, languages, and large volumes. These multi-dimensional attributes of logs pose many challenges in parsing and processing logs. IT logs are an important source of information in IT operations management. However, deriving insights from logs is a hard problem because logs are not often standardized, come in many formats, and are voluminous.

Manually analyzing logs is a time-consuming process. Moreover, for complex systems such as distributed systems, analyzing logs to diagnose a problem involves analyzing different logs of different systems. This problem is exacerbated in microservice environments where the high number of call links and the high number of applications makes locating problems very complex. System administrators in these environments face a difficult challenge to reproduce, analyze, and solve problems based only on log messages in the backend microservice. As such, when a system administrator is attempting to diagnose a specific problem for a customer, the system administrator spends large amounts of time analyzing different logs trying to identify the problem. The system administrator may also interact with the customer by asking questions and then re-analyze the logs based on the answers to the questions. The re-analyzing can prompt follow-on questions, which then begets more time analyzing logs based on the answers to these questions. This loop continues until the problem is diagnosed and remediated (e.g., fixed). These conventional methods of diagnosing problems in a computing system suffer from the problem of being too time consuming.

Implementations of the invention address this problem with conventional methods of problem diagnosis by providing systems, methods, and computer program products that are configured to provide a link tracing data structure that establishes a relationship between frontend operational behavior (e.g., at the UI) and backend microservice log messages. This link tracing data structure allows a system administrator to quickly analyze and troubleshoot a problem in a microservices environment based on a log chain of full link tracing information in the microservices environment. Embodiments create a new attribute referred to as a synchronization identifier (SyncID) that is based on an identifier of a request received from a UI. Embodiments create a new data structure referred to as a link tracing data structure (also called a Sync List) that contains information defining a link between the request received from the UI and the microservices that are called when handling the request. Embodiments create another new data structure referred to as synchronization content (Sync Content) that contains information about how the request was handled in a particular one of the microservices. Embodiments include a new management module referred to as a SyncID management module that configures, filters, and collects the log link information, and that also maintains the Sync List including instances of Sync Content in a structured and consumable format that can be presented to a user on a log analysis platform. Embodiments include a new agent module referred to as a Sync agent module that collects data for the Sync Content and passes this data to the SyncID management module.

In this manner, embodiments advantageously enable generating a full synchronization tracing chain for each request in the microservice environment, in which the frontend operational behavior as well as the backend microservice log link tracing is recorded. Embodiments also advantageously enable container-based technologies to utilize the full synchronization tracing chain from which user can quickly troubleshoot problems, which greatly reduces the communication cost and improves the efficiency of problem handling in microservices environments. Embodiments also advantageously provide an external application program interface for user to redevelopment, such as developing a frontend UI so that the status of all applications can be monitored on the UI based on the full synchronized tracing chain.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as link tracing code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

FIG. 2 shows a block diagram of an exemplary environment 205 in accordance with aspects of the invention. In embodiments, the environment 205 includes a network 210 that provides electronic communication between a user device 215 and a cluster 220 that provides online services to the user device 215. For example, the cluster 220 may host an application that user device 215 accesses and requests services of via a web UI 225. The network 210 may correspond to the WAN 102 of FIG. 1. The user device 215 may comprise an instance of end user device (EUD) 103 of FIG. 1. There is one user device 215 shown in the example of FIG. 2; however, there may be any number of user devices 215 communicating with the cluster 220.

In embodiments, the environment 205 includes an admin device 230 that includes an admin UI 235 that an admin user (e.g., a system administrator) uses to monitor the cluster 220 for IT operations management purposes. For example, an admin user may use the admin UI 235 to view IT logs that document the operations of the cluster 220. The admin device 230 may comprise an instance of end user device (EUD) 103 of FIG. 1 and may communicate with the cluster 220 via the network 210. There is one admin device 230 shown in the example of FIG. 2; however, there may be any number of admin device 230 communicating with the cluster 220.

In embodiments, the cluster 220 is a computing cluster including nodes 240 that run containerized applications that provide online services to the user device 215. In a particular example, the cluster 220 is a Kubernetes cluster. Each node 240 may comprise a computing device that hosts one or more pods 245. As is understood in the art, pods contain one or more containers, such as Docker containers. The pods 245 run on the nodes 240 and represent a single instance of a running process in the cluster 220. In embodiments, each pod 245 comprises an agent (e.g., one of 250a, 250b, . . . 250n) and a main container (e.g., one of 255a, 255b . . . 255n). In embodiments, the cluster 220 handles a request received from the web UI 225 of the user device 215 by calling microservices that are performed by the main containers 255a-n, where the performing the microservices generates a response to the request. In this manner, each main container 255a-n performs a different microservice in handling a request received from the web UI 225 of the user device 215. There are three nodes 240 shown in the example of FIG. 2; however, there may be any number of the nodes 240 in the cluster 220, and there may be any number of pods on each node.

Still referring to FIG. 2, the cluster 220 includes a control plane 260 that manages the nodes 240 and the pods 245 in the cluster 220. The control plane 260 includes a scheduler 265 that watches for newly created pods with no assigned node and selects a node for them to run on. In embodiments, the control plane 260 also includes a scaling controller 270 that is configured to scale a workload for a service to match demand for the service.

In accordance with aspects of the invention, the control plane 260 includes a management module 275 comprising a collector module 280, enable module 285, and operation module 290 that are configured to perform the inventive methods as described herein. Each of the modules 275, 280, 285, and 290 may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The control plane 260 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the collector module 280 is configured to receive information about a request from the web UI 225 and create a link tracing data structure for the request using the information about the request. In embodiments, the collector module 280 receives the information about the request from a web client 227 running on the user device 215. In embodiments, the collector module 280 creates a new link tracing data structure with a new synchronization identifier (SyncID) for each request from the web UI 225. In embodiments, the collector module 280 is also configured to receive different synchronization content from different ones of the agents 250a-n and add the received synchronization content to the link tracing data structure for the request, where the synchronization content received from a particular one of the agents 250a-n includes information about a particular one of the microservices that is called to handle the request.

In accordance with aspects of the invention, the enable module 285 is configured to enable or disable the link tracing feature for different applications hosted by the cluster 220. The cluster may have a configuration file that has an option for each application in the cluster to enable or disable the link tracing feature for that application. In this manner some applications may have the feature enabled and others may have it disabled. During startup, the enable module 285 reads this information from the configuration file and records it in a cache. When a request arrives for an application, the management module 275 determines from the cache whether the link tracing feature is enabled or disabled for this application.

In accordance with aspects of the invention, the operation module 290 is configured to manage admin user actions associated with the link tracing data structures created by the management module 275. In embodiments, the operation module 290 handles requests from the admin UI 235 to query, update, and delete ones of the link tracing data structures. In this manner, the operation module 290 provides a link tracing data structure to a requesting user, e.g., in response to a query via the admin UI 235. The providing can include transmitting data to the admin device 230 that causes the admin UI 235 to display the link tracing data structure for viewing by the requesting user.

In accordance with aspects of the invention, each agent 250a-n is configured to create certain information that is included in the synchronization content for a microservice that is called in handling the request. In embodiments, an agent (e.g., agent 250a) receives the synchronization identifier from the management module when a microservice is called for handling the request. In embodiments, the agent and creates a step identifier for the particular microservice that is called. In embodiments, the agent communicates with the main container (e.g., main container 255a) that performs the microservice and receives a synchronization message from the main container for this microservice. In embodiments, the agent creates the synchronization content including the synchronization identifier for the request, the step identifier for this microservice, and the synchronization message for this microservice, and sends this synchronization content to the collector module 280.

In embodiments, each agent 250a-n comprises a sidecar container in the same pod as a main container 255a-n. In embodiments, the agent records header information passed to it from the collector module 280 or another agent and flows the header information into the microservice. After the microservice is executed, the agent receives returned header information and flows it out to the next microservice.

In accordance with aspects of the invention, each main container 255a-n is configured to performs a different microservice in handling the request. In embodiments, a main container (e.g., main container 255a) performs a microservice by receiving a microservice request from an agent (e.g., agent 250a), executing an application based on the microservice request, and returning a response to the agent. In embodiments, a main container creates the synchronization message for this microservice and returns the synchronization message to the agent. In embodiments, the synchronization message for a particular microservice describes an execution status of the particular microservice, e.g., such as executed successfully or failed to execute.

In accordance with aspects of the invention, a web client 227 running on the user device 215 is configured to create information about a request made in the web UI 225. In embodiments, the information about the request includes a request identifier, request start time, request path, and request event. In embodiments, the request path and request event comprise information about user actions in the web UI 225. For example, a user may log into a system on the user device 215 and open the "Explore the Automation Domains page" and operate the "E2EADPT_X/APG" resource via a dialog box. In this example, the request path is "/Welcome_Page/Explore Automation Domains/E2EADPT_X/APG". In this example, the user may add request information such as parameter settings used by restarting resources that are recorded. In the example, the request event is "/tasks/REQUEST_ONLINE".

FIG. 3 shows an example of a link tracing data structure 305 in accordance with aspects of the invention. In embodiments, the link tracing data structure 305 includes a header 310 and plural sections 315a. 315b, 315c containing of synchronization content from different microservices called for this request. In this example, there are three sections 315a, 315b, 315c of synchronization content, although other numbers of sections of synchronization content may be present depending on the number of microservices called to handle the request for which this link tracing data structure 305 is created. The link tracing data structure 305 of FIG. 3 is used with reference to elements depicted in FIG. 2 to describe an example use case of embodiments of the present invention.

In embodiments, a user utilizes the web UI 225 to generate a request to an application hosted by the cluster 220. In embodiments, the web client 227 on the user device 215 creates information about the request (also referred to as request information) including a request identifier, request start time, request path, and request event. The user device 215 sends the request and the request information to the cluster 220 where it is received by the collector module 280.

In response to receiving request information from the web client of the user device 215, after verifying that the link tracing feature is enabled for the application associated with the request, the collector module 280 creates a header 310 of a new link tracing data structure 305 for this request. In embodiments, the header 310 includes certain of the request information, including the request start time 321, the request event 322, and the request path 323. In embodiments, the header 310 also includes certain information created by the collector module 280, including a synchronization identifier 324 and a root step identifier 325. In embodiments, the collector module 280 creates the synchronization identifier 324 based on the request identifier of the request information and a generation time of the synchronization identifier. In an example, the collector module 280 creates the synchronization identifier 324 by adding the hexadecimal number of the request identifier to the generation time of the synchronization identifier.

In the example of FIG. 3, the control plane 260 handles the request by calling a first microservice associated with main container 255a. As part of the call to the microservice associated with main container 255a, the collector module 280 passes the synchronization identifier 324 and the root step identifier 325 to the agent 250a in the pod with the main container 255a. In response to this, the agent 250a creates a step identifier 331 for this first microservice. In embodiments, the step identifier is the minimum work unit of microservice link tracing and represents the location of this call in a call link tree. In embodiments, the step identifier is created using a step identifier generating algorithm that is based on: a server IP address (e.g., a hexadecimal digit occupying 8 bits where every two bits represents a segment of the IP address); a time of generating the step identifier (e.g., occupying 13 bits); a value from an auto-increment sequence (e.g., the sequence occupying 4 bits and automatically rising from 1000 to 9000, and after reaching 9000 returning to 1000 and incrementing from there); and a current process number (e.g., a current process identifier occupying 5 bits). In embodiments, the agent 250a sends a microservice request to the main container 255a, which executes the first microservice, creates a synchronization message 335 for this microservice, and returns the synchronization message 335 to the agent 250a. In this example, the synchronization message 335 indicates that the microservice request was successfully executed. In embodiments, the agent 250a sends synchronization content for this first microservice to the collector module 280, the synchronization content including: the synchronization identifier 324, the step identifier 331 for this microservice, the parent step identifier 332, the start time of this microservice 333, the duration of this microservice 334, and the synchronization message 335 for this microservice. In response to receiving this synchronization content from the agent 250a, the collector module 280 adds this synchronization content to the link tracing data structure 305 at section 315a.

In the example of FIG. 3, the control plane 260 continues handling the request by next calling a second microservice associated with main container 255b. As part of the call to the microservice associated with main container 255b, the agent 250a passes the synchronization identifier 324 and the step identifier 331 (of the first microservice) to the agent 250b in the pod with the main container 255b. In response to this, the agent 250b creates a step identifier 341 for this second microservice using the step identifier generating algorithm described above. The step identifier 341 for the second microservice differs from the step identifier 331 for the first microservice because the inputs to the algorithm are different. In embodiments, the agent 250b sends a microservice request to the main container 255b, which executes the second microservice, creates a synchronization message 345 for this microservice, and returns the synchronization message 345 to the agent 250b. In this example, the synchronization message 345 indicates that the microservice request was successfully executed. In embodiments, the agent 250b sends synchronization content for this second microservice to the collector module 280, the synchronization content including: the synchronization identifier 324, the step identifier 341 for this microservice, the parent step identifier 342 (which equals the step identifier 331 of the first microservice), the start time of this microservice 343, the duration of this microservice 344, and the synchronization message 345 for this microservice. In response to receiving this synchronization content from the agent 250b, the collector module 280 adds this synchronization content to the link tracing data structure 305 at section 315b.

In the example of FIG. 3, the control plane 260 continues handling the request by next calling a third microservice associated with main container 255c. As part of the call to the microservice associated with main container 255c, the agent 250b passes the synchronization identifier 324 and the step identifier 341 (of the second microservice) to the agent 250c in the pod with the main container 255c. In response to this, the agent 250c creates a step identifier 351 for this third microservice using the step identifier generating algorithm described above. The step identifier 351 for the third microservice differs from the previous step identifiers 331 and 341 because the inputs to the algorithm are different. In embodiments, the agent 250c sends a microservice request to the main container 255c, which executes the third microservice, creates a synchronization message 355 for this microservice, and returns the synchronization message 355 to the agent 250c. In this example, the synchronization message 355 indicates that the microservice failed to executed. The synchronization message 355 may additionally indicate any exceptions. In embodiments, the agent 250c sends synchronization content for this third microservice to the collector module 280, the synchronization content including: the synchronization identifier 324, the step identifier 351 for this microservice, the parent step identifier 352 (which equals the step identifier 341 of the second microservice), the start time of this microservice 353, the duration of this microservice 354, and the synchronization message 355 for this microservice. In response to receiving this synchronization content from the agent 250c, the collector module 280 adds this synchronization content to the link tracing data structure 305 at section 315c.

In embodiments, the operation module 290 stores the link tracing data structure 305. In embodiments, in response to receiving a request for the link tracing data structure 305 from a requesting user (e.g., via the admin UI 235), the operation module 290 provides the link tracing data structure 305 to the requesting user. In this manner, a system administrator may view the link tracing data structure 305 and quickly troubleshoot the problem that occurred with this request by reviewing the UI information about the request (e.g., the request event 322, and the request path 323), the chain of microservices called to handle this request, and the specific microservice that failed to execute properly in attempting to handle this request. In this manner, when the system administrator analyzes the problem using the link tracing data structure 305, they can quickly and easily see from the synchronization messages 335, 345, 355 which microservice failed to execute properly, and they can see from the request event 322, and the request path 323 what user actions in the web UI 225 resulted in this problem. This quick and easy identification of the failed microservice and the related user actions in the web UI 225 helps the system administrator diagnose, and eventually fix, the problem faster than conventional methods that involve repeatedly asking the user what they did, waiting for their response, and manually analyzing different logs for different microservices based on their response. In this manner, by providing faster identification the problem in the microservices, implementations of the invention provide an improvement in the technical field of IT operations management.

FIG. 4 shows a flowchart of an exemplary method in accordance with aspects of the present invention. Steps of the method may be carried out in the environment of FIG. 2 and are described with reference to elements depicted in FIG. 2.

At step 405, the system creates a link tracing data structure in response to receiving a request from a user interface (UI). For example, a collector module may create a new link tracing data structure for each request received from a web UI. In embodiments, the link tracing data structure may include a synchronization identifier and information about user actions in the UI. In embodiments, the information about the user actions in the UI may comprise request event information and request path information generated by a web client associated with the UI. The request path information may include information about a path the user navigated in the web UI prior to sending the request.

At step 410, the system handles the request by calling plural microservices. For example, as described herein, a control plane of a cluster may handle the request from the UI by calling different microservices that are executed by different containers in the cluster.

At step 415, the system adds respective synchronization content for each one of the plural microservices to the link tracing data structure. For example, as described herein, a collector module may receive synchronization content from an agent in a pod of a main container executing a microservice, and the collector module may add (e.g. append) that synchronization content to the link tracing data structure for this request. In embodiments, the respective synchronization content for a respective one of the plural microservices comprises: the synchronization identifier; a respective step identifier that identifies the respective one of the plural microservices; and a respective synchronization message that describes an execution status of the respective one of the plural microservices. In embodiments, a main container of a respective one of the plural microservices may create the respective synchronization message, and an agent of the respective one of the plural microservices may create the respective step identifier. In one example, the agent comprises a sidecar in a same pod as the main container.

At step 420, the system stores the link tracing data structure. For example, as described herein, an operation module may store the link tracing data structure. At step 425, the system provides the link tracing data structure to a requesting user. For example, as described herein, an operation module may receive a request for the link tracing data structure and provide the link tracing data structure to the requesting user in response to the request.

In embodiments of the method, a collector module may be part of a management module in a control plane of the computing cluster and may create the link tracing data structure, create the synchronization identifier, and add the respective synchronization content for each one of the plural microservices to the link tracing data structure.

Figure 5:
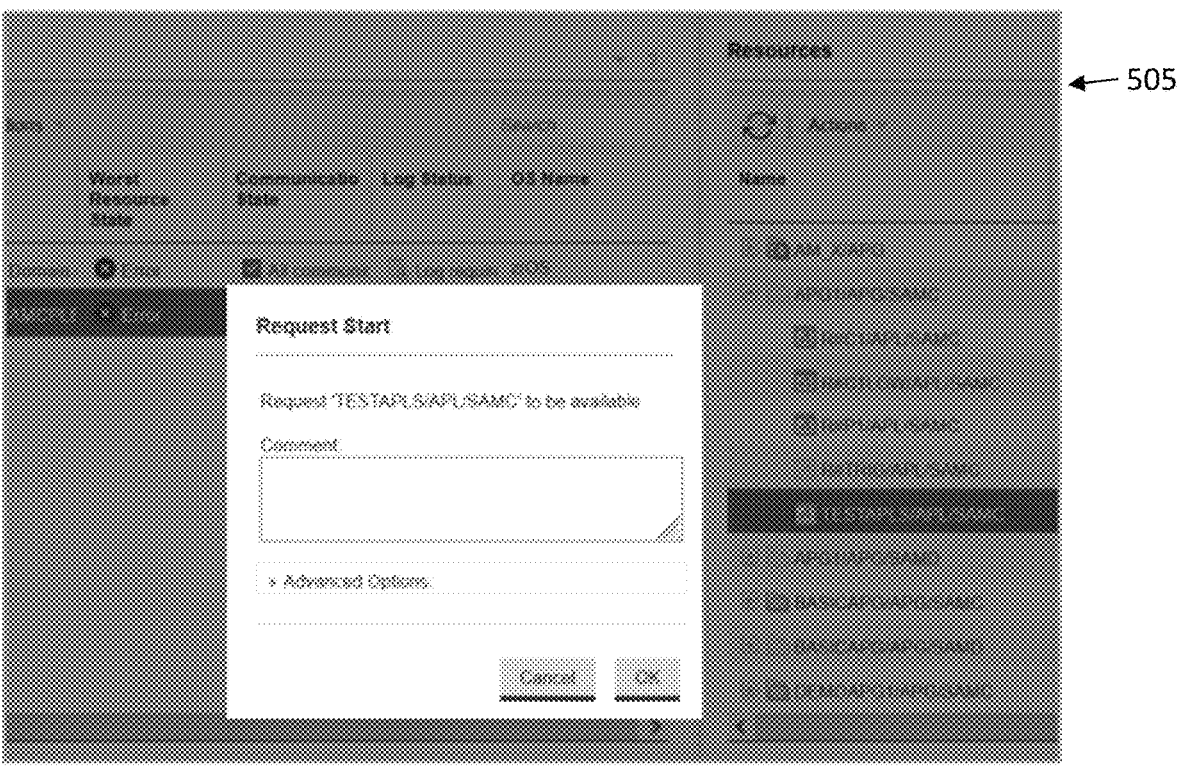
FIG. 5 shows an example of a request and request information in accordance with aspects of the present invention.

FIG. 5 shows an example of a request 505 made in a UI (e.g., such as web UI 225) and an example of request information 510 the web client 227 creates based on the request 505.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    creating, by a processor set, a link tracing data structure in response to receiving a request from a user interface (UI), wherein the link tracing data structure includes a synchronization identifier and information about user actions in the UI;
    creating, by the processor set, the synchronization identifier based on a request identifier of the request and a generation time of the synchronization identifier;
    handling, by the processor set, the request by calling plural microservices;
    adding, by the processor set, respective synchronization content for each one of the plural microservices to the link tracing data structure, wherein the respective synchronization content for a respective one of the plural microservices comprises: the synchronization identifier; a respective step identifier that identifies the respective one of the plural microservices; and a respective synchronization message that describes an execution status of the respective one of the plural microservices;
    storing, by the processor set, the link tracing data structure; and
    providing, by the processor set, the link tracing data structure to a requesting user.

2. The method of claim 1, wherein the link tracing data structure that is provided to the requesting user is displayable in human-readable form and includes the synchronization identifier in a header of the link tracing data structure, the information about the user actions in the UI in the header, and the respective synchronization content for each one of the plural microservices in respective sections apart from the header.

3. The method of claim 1, wherein the information about the user actions in the UI comprises request event information and request path information generated by a web client associated with the UI.

4. The method of claim 1, wherein, in the respective synchronization content for a respective one of the plural microservices, the synchronization content message indicates that the respective one of the plural microservices executed successfully or failed to execute.

5. The method of claim 1, further comprising creating the respective step identifier in the respective synchronization content for a respective one of the plural microservices, wherein the respective step identifier is based on a server IP address, a generation time of the step identifier, an increment sequence, and a process number.

6. The method of claim 1, wherein the creating the synchronization identifier comprises adding a number associated with the request identifier to the generation time of the synchronization identifier.

7. The method of claim 1, wherein the respective synchronization content for a respective one of the plural microservices includes a data field that identifies a parent of the respective one of the plural microservices.

8. The method of claim 1, wherein, in the respective synchronization content for a respective one of the plural microservices, a main container of the respective one of the plural microservices creates the respective synchronization message, and an agent of the respective one of the plural microservices creates the respective step identifier.

9. The method of claim 8, wherein the agent comprises a sidecar in a same pod as the main container.

10. The method of claim 1, wherein a management module in a control plane of the computing cluster creates the link tracing data structure, creates the synchronization identifier, and adds the respective synchronization content for each one of the plural microservices to the link tracing data structure.

11. A computer program product comprising one or more computer readable storage media having program instructions collectively stored on the one or more computer readable storage media, the program instructions executable to:
    create a link tracing data structure in response to receiving a request from a user interface (UI), wherein the link tracing data structure includes a synchronization identifier and information about user actions in the UI;
    create the synchronization identifier based on a request identifier of the request and a generation time of the synchronization identifier;
    handle the request by calling plural microservices;
    add respective synchronization content for each one of the plural microservices to the link tracing data structure, wherein the respective synchronization content for a respective one of the plural microservices comprises: the synchronization identifier; a respective step identifier that identifies the respective one of the plural microservices; and a respective synchronization message that describes an execution status of the respective one of the plural microservices;
    store the link tracing data structure; and
    provide the link tracing data structure to a requesting user.

12. The computer program product of claim 11, wherein the link tracing data structure that is provided to the requesting user includes the synchronization identifier in a header of the link tracing data structure, the information about the user actions in the UI in the header, and the respective synchronization content for each one of the plural microservices in respective sections of the link tracing data structure apart from the header, and wherein each of the respective sections includes the synchronization identifier.

13. The computer program product of claim 11, wherein the information about the user actions in the UI comprises request event information and request path information generated by a web client associated with the UI.

14. The computer program product of claim 11, wherein, in the respective synchronization content for a respective one of the plural microservices, the synchronization content message indicates that the respective one of the plural microservices executed successfully or failed to execute.

15. The computer program product of claim 11, wherein the program instructions are executable to create the respective step identifier in the respective synchronization content for a respective one of the plural microservices, wherein the respective step identifier is based on a server IP address, a generation time of the step identifier, an increment sequence, and a process number.

16. A system comprising:

a processor set, one or more computer readable storage media, and program instructions collectively stored on the one or more computer readable storage media, the program instructions executable to:

create a link tracing data structure in response to receiving a request from a user interface (UI), wherein the link tracing data structure includes a synchronization identifier and information about user actions in the UI;

create the synchronization identifier based on a request identifier of the request and a generation time of the synchronization identifier;

handle the request by calling plural microservices;

add respective synchronization content for each one of the plural microservices to the link tracing data structure, wherein the respective synchronization content for a respective one of the plural microservices comprises: the synchronization identifier; a respective step identifier that identifies the respective one of the plural microservices; and a respective synchronization message that describes an execution status of the respective one of the plural microservices;

store the link tracing data structure; and provide the link tracing data structure to a requesting user.

17. The system of claim 16, wherein the program instructions are executable to create the synchronization identifier by adding a hexadecimal number of the request identifier to the generation time of the synchronization identifier.

18. The system of claim 16, wherein the respective synchronization content for a respective one of the plural microservices includes a data field that identifies a parent of the respective one of the plural microservices.

19. The system of claim 16, wherein, in the respective synchronization content for a respective one of the plural microservices, a main container of the respective one of the plural microservices creates the respective synchronization message, and an agent of the respective one of the plural microservices creates the respective step identifier in response to receiving the synchronization identifier and a root step identifier from a management module in a control plane of the computing cluster.

20. The system of claim 16, wherein a management module in a control plane of the computing cluster creates the link tracing data structure, creates the synchronization identifier, and adds the respective synchronization content for each one of the plural microservices to the link tracing data structure.

* * * * *